C. HILL.
HOSE COUPLING.
APPLICATION FILED JAN. 31, 1911.
1,039,536.
Patented Sept. 24, 1912.
2 SHEETS—SHEET 2.
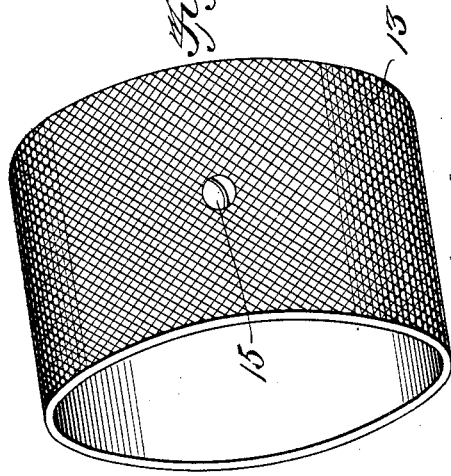
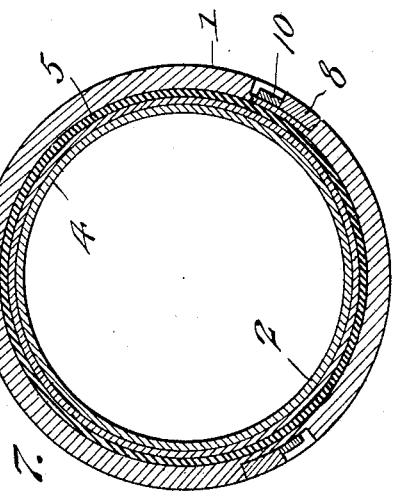
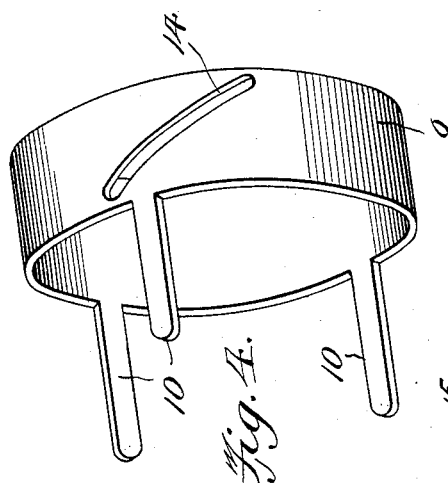
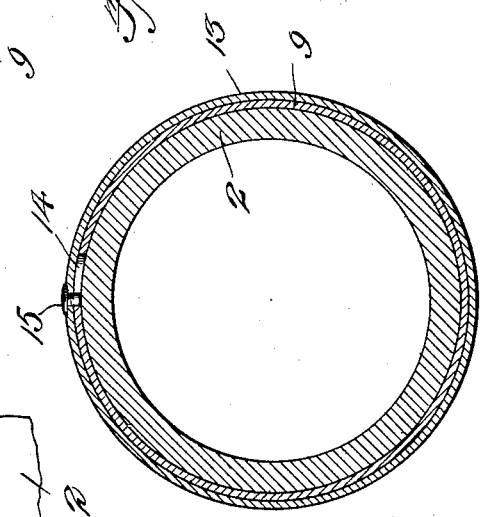
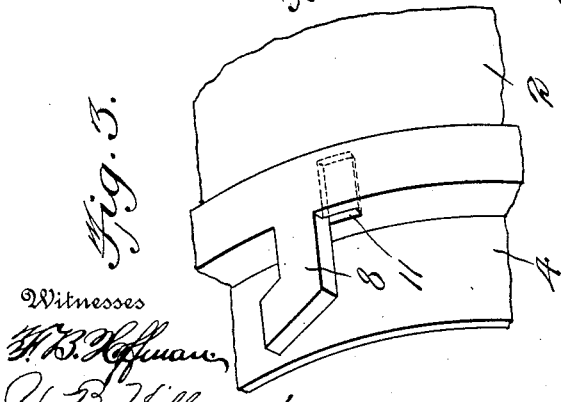
Witnesses
Inventor
Charles Hill
By Victor J. Evans
Attorney

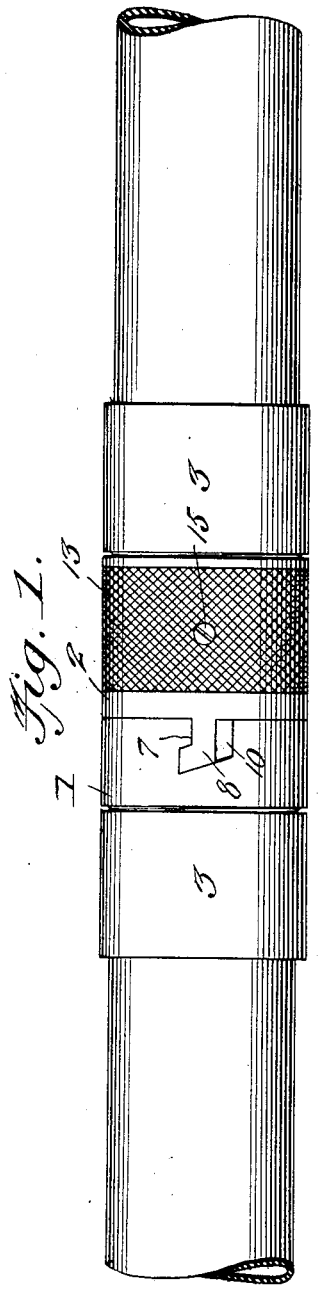
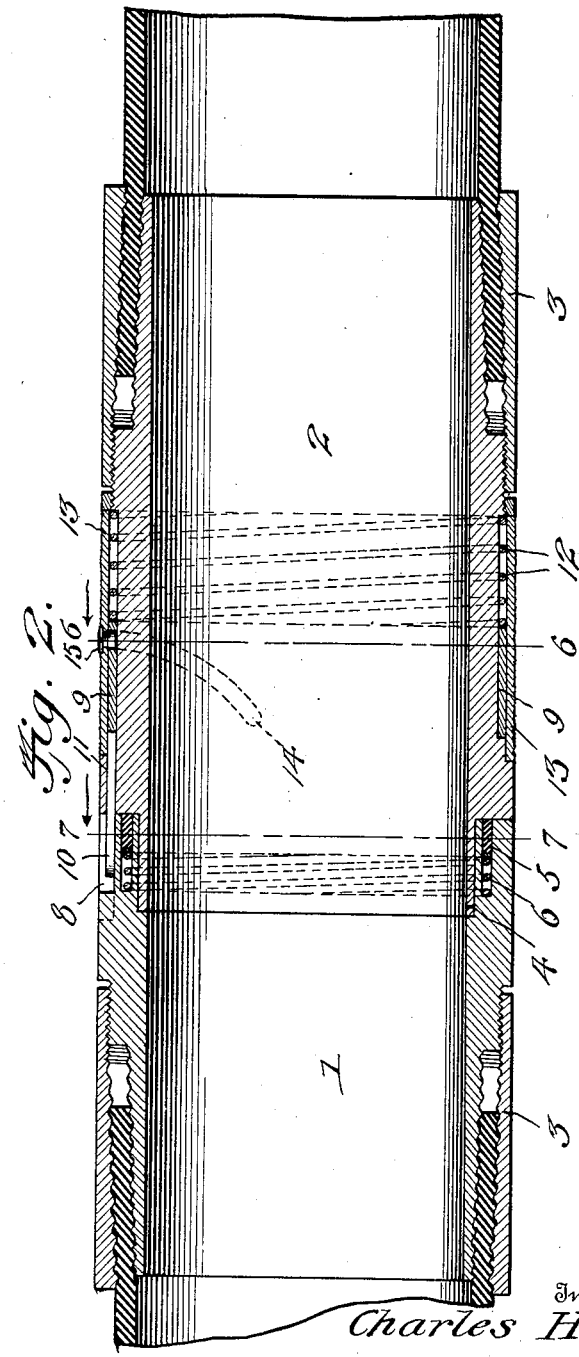

UNITED STATES PATENT OFFICE.

CHARLES HILL, OF MULLAN, IDAHO.

HOSE-COUPLING.

1,039,536. Specification of Letters Patent. Patented Sept. 24, 1912.

Application filed January 31, 1911. Serial No. 605,704.

*To all whom it may concern:*

Be it known that I, CHARLES HILL, a citizen of the United States, residing at Mullan, in the county of Shoshone and State of Idaho, have invented new and useful Improvements in Hose-Couplings, of which the following is a specification.

This invention provides a novel connector or coupling hose, the purpose being the provision of means whereby the coupling may be quickly effected and is both secure and substantial.

The invention provides a coupling which admits of sections of hose being instantly connected or separated, the parts being locked when connected against possible accidental separation, the coupling being adapted for hose of every description for carrying liquid, gas, or air.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a side view of a hose coupling embodying the invention. Fig. 2 is a central longitudinal section thereof on a larger scale. Fig. 3 is a fragmentary view in perspective of the coupling member having the bayonet projections. Fig. 4 is a detail perspective view of the collar provided with the locking fingers. Fig. 5 is a detail perspective view of the sleeve having a pin and slot connection with the collar for moving the same. Fig. 6 is a transverse section on the line 6—6 of Fig. 2. Fig. 7 is a transverse section on the line 7—7 of Fig. 2.

Corresponding and like parts are referred to in the following description, and indicated in all the views of the drawings, by the same reference characters.

The coupling comprises two members 1 and 2 each having a tapered end to receive the end of a hose section and a sleeve 3 for securing the hose section in place when slipped upon the tapered end of the coupling member. The member 1 has its opening enlarged at its outer end to receive a reduced portion 4 at the outer end of the member 2. An annular recess is formed in the outer end of the member 1 and receives a packing 5 and a spring 6, the latter normally exerting an outward pressure upon the packing 5 to insure the formation of a tight joint between the abutting ends of the members 1 and 2 when coupled. Bayonet slots 7 are provided in the sides of the member 1, the inner ends of the slots inclining. The number of bayonet slots may vary and will depend upon the size of the coupling. The member 2 has bayonet projections 8 corresponding in position and number with the bayonet slot 7, the outer ends of the bayonet projections inclining to coincide with the inclination of the inner ends of the bayonet slots. After the bayonet projections have been slipped into the bayonet slots the members 1 and 2 are relatively turned to cause the outer ends of the bayonet projections to ride upon the inclined walls of the inner ends of the bayonet slots, thereby drawing the members 1 and 2 together to insure the formation of a tight joint. The reduced portion 4 at the outer end of the member 2 forms a guide to insure alining of the members and at the same time overlaps the joint formed between the abutting ends of the members, thereby increasing the chances for maintaining a tight joint. The bayonet projections 8 are spaced from the reduced portion 4, thereby resulting in a portion of the member 1 being confined between the part 4 and the bayonet projections 8, as shown most clearly in Figs. 2 and 7.

A collar 9 is snugly fitted upon the member 2 and has a limited sliding movement thereon. Fingers 10 project from the collar 9 and are adapted to enter the bayonet slots 7 and retain the bayonet projections therein against casual displacement. The locking fingers 10 pass through slots 11 formed longitudinally in the outer portion of the member and at one side of the bayonet projections 8. The locking fingers 10 are slidable longitudinally in the slots 11 and when retracted clear the bayonet slots so that the bayonet projections 8 may have a lateral movement therein to disengage their outer ends from the inner ends of the bayonet slots. A spring 12 is mounted upon the member 2 and normally exerts a pressure to force the collar 9 outward and hold the locking fingers 10 within the bayonet slots 7. The collar 9 may be moved by suitable means, but it is preferred to employ a sleeve 13 which is rotatable upon the member 2 and has a pin and slot connection with the collar 9. The outer surface of the sleeve 13 is roughened or milled to enable the hand to obtain a firm grip thereon. The collar 9 has an inclined slot 14 into which a screw or pin 15 extends, said screw or pin being carried by the sleeve 13. The sleeve 13 encircles the collar 9 and spring 12 and houses and protects the same. Upon turning the sleeve 13 in one direction the collar 9 is moved inward, thereby withdrawing the locking fingers 10 so as to clear the bayonet slots, thereby admitting of the bayonet projections entering or leaving the bayonet slots. Upon turning the sleeve 13 in an opposite direction the collar 9 is moved outward, thereby projecting the locking fingers 10 into the bayonet slots and preventing lateral movement of the bayonet projections and securing the members of the coupling when placed together.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A coupling comprising a member having bayonet slots in its outer side and having the opening enlarged at its outer end and having said outer end formed with an annular recess, a packing fitted in said annular recess, a second member having its outer end reduced to enter the enlarged opening of the first member and formed with bayonet projections spaced from the said reduced end portion and having openings adjacent and at one side of the bayonet projections, a collar mounted upon the said second member to slide longitudinally thereon and having fingers to pass through the openings thereof and enter the bayonet slots, said collar having an inclined slot, a sleeve rotatable upon the second member, a pin projecting from the sleeve and extending into the inclined slot of the said collar, and an expansible helical spring encircling the second member and exerting an outward pressure upon the collar, said collar and spring being inclosed by the said sleeve.

In testimony whereof I affix my signature in presence of two witnesses.

CHARLES HILL.

Witnesses:
 WALFRID TORVINEU,
 THOS. G. KENNEDY.

---

Copies of this patent may be obtained for five cents each, by addressing the "Commissioner of Patents Washington, D. C."